(12) United States Patent
Shao et al.

(10) Patent No.: US 8,593,794 B2
(45) Date of Patent: Nov. 26, 2013

(54) HINGE ASSEMBLY FOR FOLDABLE ELECTRONIC DEVICE

(75) Inventors: Min Shao, Shenzhen (CN); Chao Duan, Shenzhen (CN); Chia-Hua Chen, Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 553 days.

(21) Appl. No.: 12/952,361

(22) Filed: Nov. 23, 2010

(65) Prior Publication Data

US 2012/0099248 A1    Apr. 26, 2012

(30) Foreign Application Priority Data

Oct. 21, 2010   (CN) .......................... 2010 1 0514475

(51) Int. Cl.
*H05K 5/00*    (2006.01)
(52) U.S. Cl.
USPC .................................................... 361/679.01
(58) Field of Classification Search
USPC .................................................... 361/679.01
See application file for complete search history.

(56) References Cited

U.S. PATENT DOCUMENTS

| 7,085,375 B2* | 8/2006 | Katoh .................... 379/433.13 |
| 7,647,674 B2* | 1/2010 | Duan et al. .................... 16/330 |
| 7,707,688 B2* | 5/2010 | Ishikawa et al. .................... 16/303 |
| 2004/0237259 A1* | 12/2004 | Huang et al. .................... 16/330 |
| 2006/0112517 A1* | 6/2006 | Luo et al. .................... 16/330 |
| 2007/0094842 A1* | 5/2007 | Chang .................... 16/330 |
| 2009/0300882 A1* | 12/2009 | Hayashi .................... 16/303 |
| 2010/0033912 A1* | 2/2010 | Kondou .................... 361/679.01 |
| 2011/0188183 A1* | 8/2011 | Wu et al. .................... 361/679.01 |
| 2011/0273821 A1* | 11/2011 | Shen .................... 361/679.01 |
| 2011/0279962 A1* | 11/2011 | Chiang et al. .................... 361/679.21 |
| 2011/0286160 A1* | 11/2011 | Duan et al. .................... 361/679.01 |
| 2012/0057282 A1* | 3/2012 | Wang et al. .................... 361/679.01 |
| 2012/0236476 A1* | 9/2012 | Wu et al. .................... 361/679.01 |

FOREIGN PATENT DOCUMENTS

CN    102116345 A    7/2011

* cited by examiner

*Primary Examiner* — Forrest M Phillips

(74) *Attorney, Agent, or Firm* — Altis & Wispro Law Group, Inc.

(57) ABSTRACT

A hinge assembly includes a shaft, a seat made of plastic, a follower, a cam, a latching member, a resilient member, and a sleeve. The follower includes a cam surface. The seat is fixed to the follower, and the seat and the follower are placed around the shaft. The cam has a latching cam surface, the cam surface is engaged with the cam latching surface. The latching member is fixed to the cam, and the cam and the latching member are placed around the shaft. An outer diameter of the cam is smaller than the latching member. The resilient member is placed around the shaft and provides an elastic force to make the cam surface abut against the latching cam surface. The sleeve receives the cam, the latching member, and the resilient member, and the latching member engages with the sleeve.

14 Claims, 4 Drawing Sheets

HINGE ASSEMBLY FOR FOLDABLE ELECTRONIC DEVICE

BACKGROUND

1. Technical Field

The present disclosure relates to hinge assemblies and, particularly, to a hinge assembly for foldable electronic devices such as mobile phones, and portable computers.

2. Description of Related Art

At present, perhaps the most popular portable electronic device in the marketplace is the foldable mobile phone, which generally includes a cover section and a body section. The cover section and the body section are rotatably interconnected through a hinge assembly, for switching the telephone between an in-use position and a closed position.

One kind of hinge assembly employs a cam and a follower made of metal. Although this hinge assembly may achieve the opening and closing of the foldable electronic device, the hinge assembly may be noisy during rotation. If the cam and the follower are made of plastic, although volume of the noise may be reduced, the cam and the follower may break more easily.

Therefore, there is room for improvement within the art.

BRIEF DESCRIPTION OF THE DRAWINGS

Many aspects of the present hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION

Figure 1:
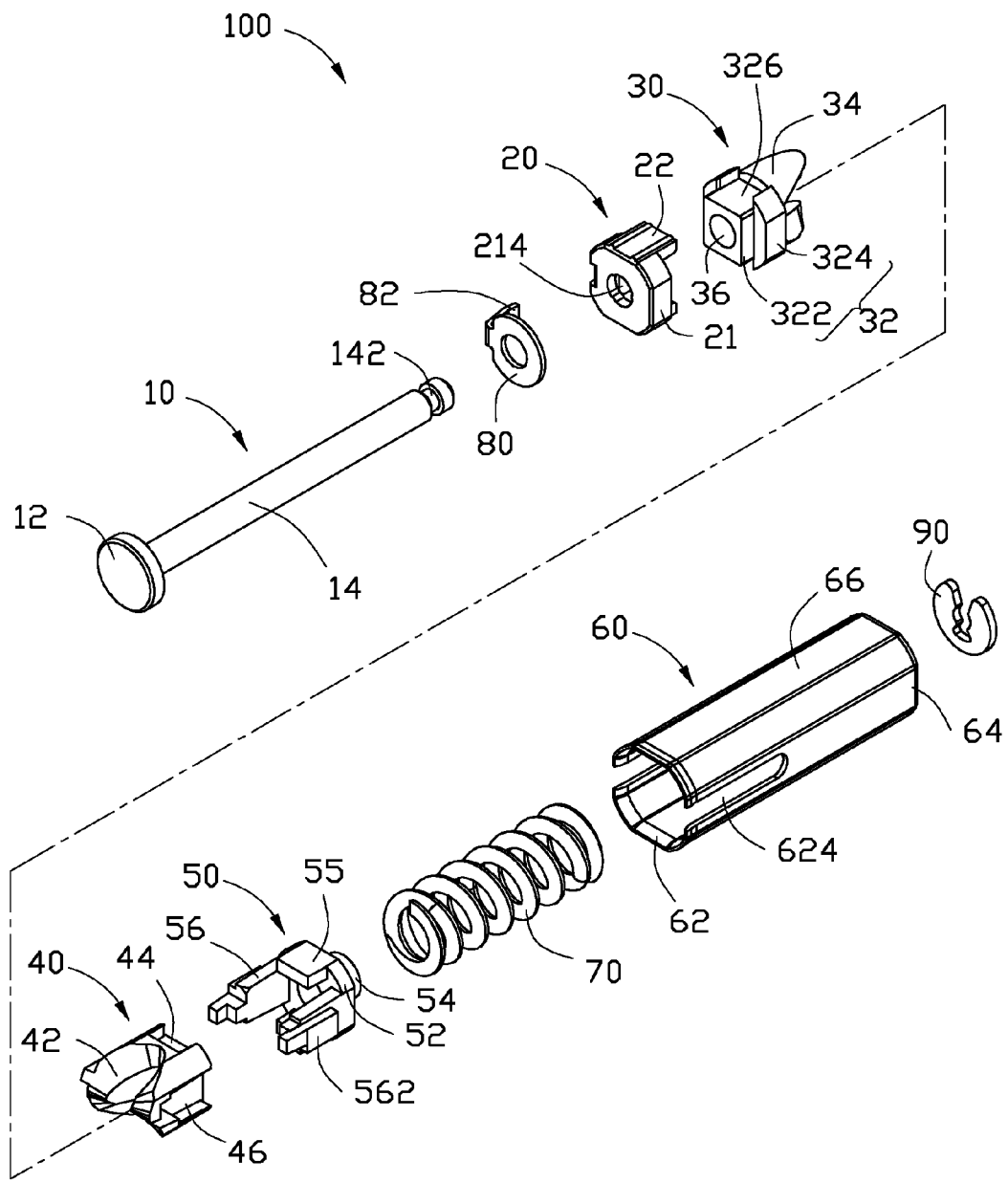
FIG. 1 is an exploded, isometric view of a hinge assembly.
Figure 2:
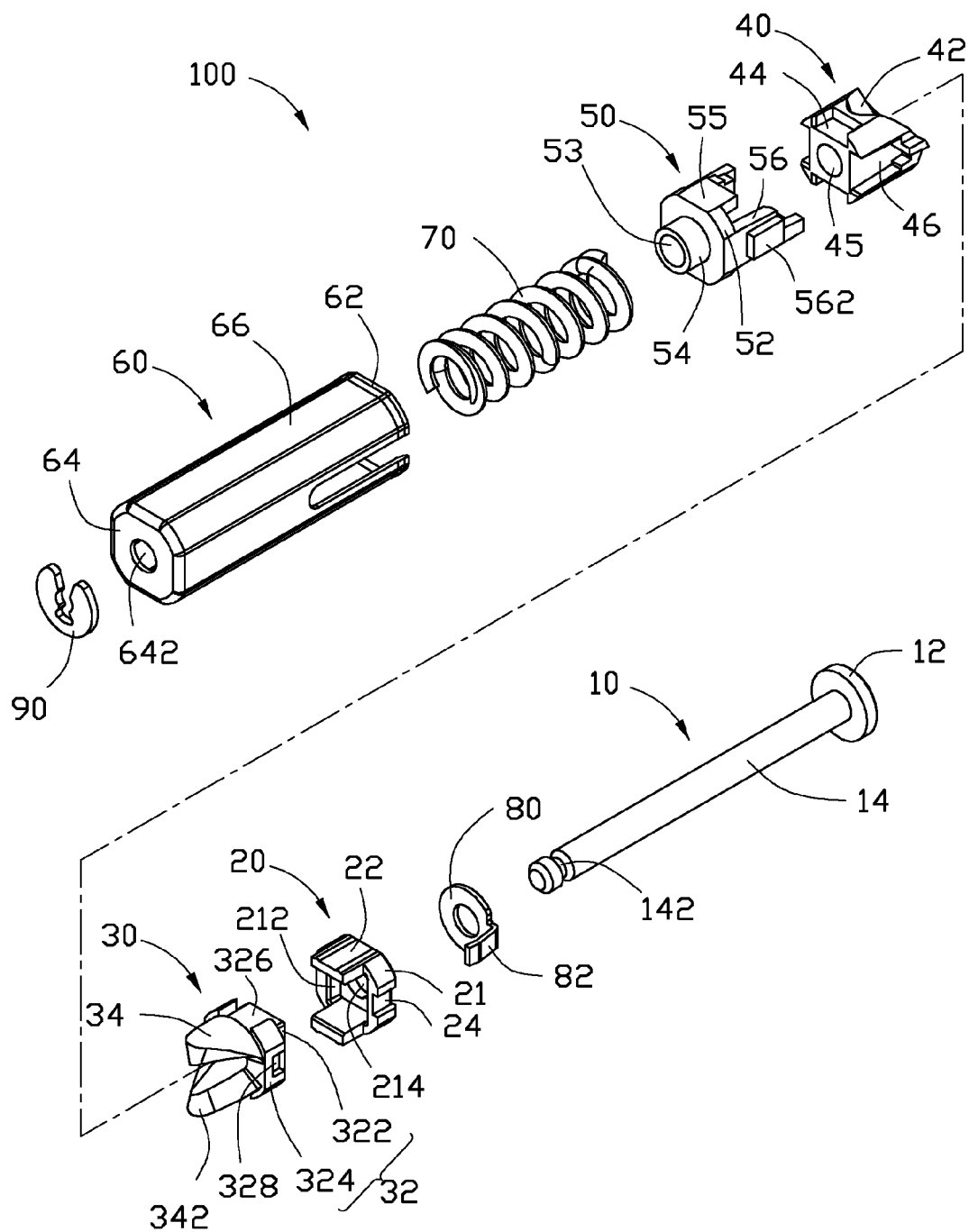
FIG. 2 is similar to FIG. 1, but shown from another aspect.

FIGS. 1 and 2 show a hinge assembly 100 according to an exemplary embodiment of the present hinge system. The hinge assembly 100 includes a main shaft 10, a seat 20, a follower 30, a cam 40, a latching member 50, a sleeve 60, a resilient member 70, a conductive member 80, and a washer 90.

The main shaft 10 is made of metal, and coaxially includes a head portion 12 and a shaft portion 14. The shaft portion 14 extends from one end of the head portion 12 and has a smaller diameter than the diameter of the head portion 12. A free end of the shaft portion 14 defines a ring groove 142.

The seat 20 is made of plastic, and the follower 30 is made of metal. The seat 20 and the follower 30 are secured to each other so that the seat 20 cannot move or rotate relative to the follower 30. An outer diameter of the follower 30 is smaller than the seat 20 so that the seat 20 only engages with the body section of a foldable electronic device. Since the seat 20 is made of plastic, the noises between the seat and the body section of the foldable electronic device will be reduced. In an exemplary embodiment, the seat 20 is latched to the follower 30.

The seat 20 has a polygonal body 21. A circular hole 214 is defined at one side of the polygonal body 21, and a square latching hole 212 is defined on the other side. The circular hole 214 communicates with the latching hole 212. Two extensions 22 extend from an outer surface of the polygonal body 21. A groove 24 is defined at one side of the polygonal body 21.

The follower 30 is made of metal, and includes a main portion 32 and a cam portion 34 integrally formed together. The main portion 32 has a shape corresponding to the seat 20, and includes a block 322 and two ledges 324. The block 322 can be received in the latching hole 212. Two receiving grooves 326 are defined between the ledges 324 for receiving the extensions 22. One of the ledges 324 defines a latching groove 328 opposite to the groove 24. The cam portion 34 is formed at one side of the main portion 32. The cam portion 34 includes a first cam surface 342. The follower 30 defines a through hole 36. The through hole 36 communicates the main portion 32 with the cam portion 34.

The cam 40 is made of metal, and the latching member 50 is made of plastic. The cam 40 and the latching member 50 are secured to each other so that the cam 40 cannot move or rotate relative to the latching member 50. An outer diameter of the cam 40 is smaller than the latching member 50 so that the cam 40 cannot contact the sleeve 60 when the latching member 50 and the cam 40 are received in the sleeve 60. The latching member 50 only engages with the sleeve 60. Since the latching member 50 is made of plastic, the wear for the sleeve 60 is greatly reduced. In an exemplary embodiment, the cam 40 is latched to the latching member 50.

The cam 40 includes a second cam surface 42 for engaging with the first cam surface 342 of the follower 30. Two slots 44 and two retaining grooves 46 are symmetrically formed on an outer periphery of the cam 40. A distal end of each retaining groove 46 is stepped. The cam 40 defines a passage 45 for receiving the shaft portion 14.

The latching member 50 includes a main body 52 and a guiding shaft 54. Two extending plates 55 and two arms 56 extend from the main body 52 opposite to the guiding shaft 54. A projection 562 is formed on each arm 56. A distal end of the projection 562 is substantially stepped for engaging with a corresponding retaining groove 46. The extending plates 55 can be received in the slots 44, and the arms 56 can be latched in the retaining grooves 46 to secure the latching member 50 to the cam 40. A central hole 53 is defined in the guiding portion 54, and communicates with the main body 52 and the guiding shaft 54.

The sleeve 60 is substantially a hollow cylinder, and includes a first open end 62 and a second open end 64 opposite to each other. The sleeve 60 defines two guiding slots 624 for receiving the projections 562. At least one flattened surface 66 is formed on an outer peripheral wall of the sleeve 60. The flat surface portions 66 engage with a cover section of the foldable electronic device.

The resilient member 70 is preferably made of metal and is spiral-shaped (i.e. a coil spring). The resilient member 70 is just large enough to be placed around the main shaft 10, and can be received in the sleeve 60.

The conductive member 80 is disposed between the head portion 12 and the seat 20 for electrically connecting the main shaft 10 and the follower 30. In an exemplary embodiment, the conductive member 80 includes a finger 82 for being received in the groove 24 and the latching groove 328.

The washer 90 is made of made of a strong material, such as metal. In the present embodiment, the washer 90 is substantially C-shaped and is clasped in the ring groove 142, thereby mounted with the main shaft 10.

Figure 3:
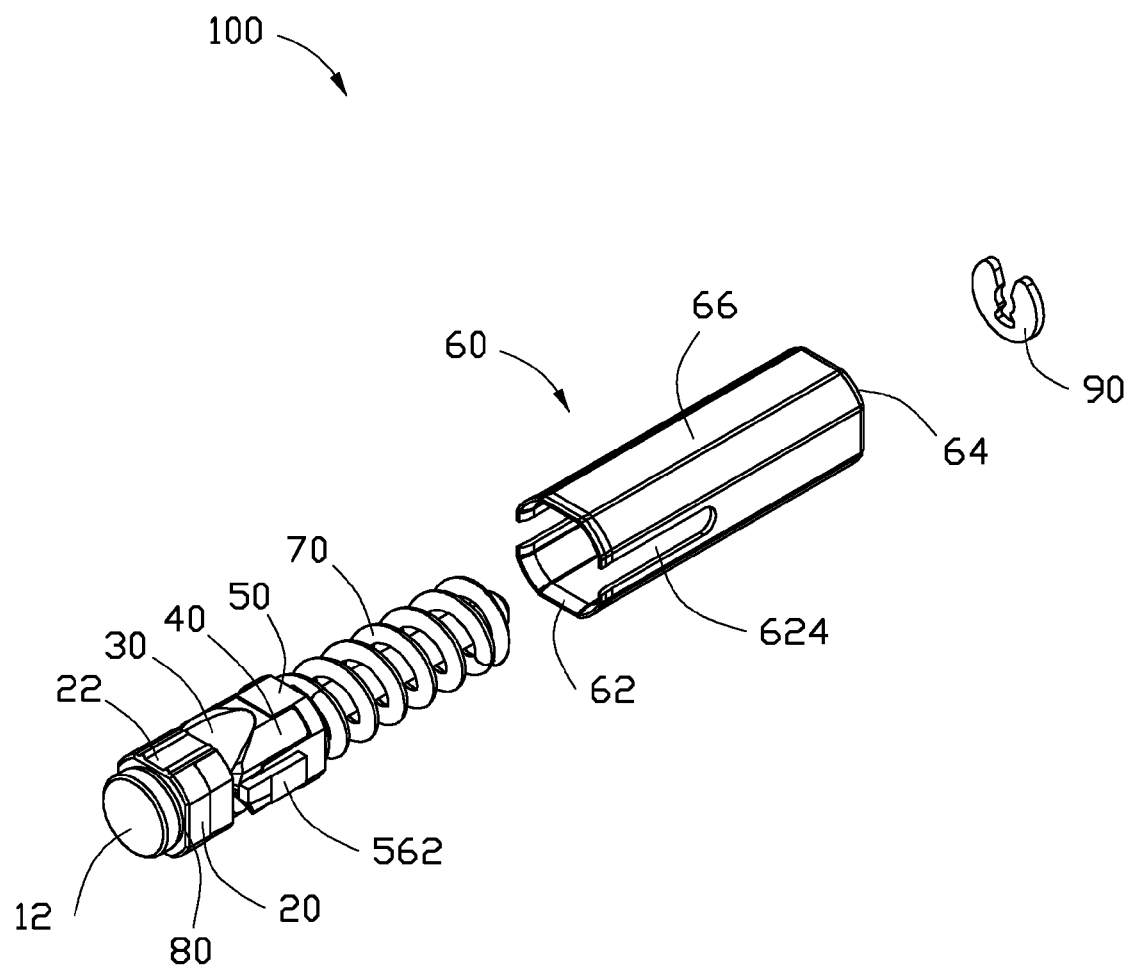
FIG. 3 is a partially assembled view of the hinge assembly shown in FIG. 1.
Figure 4:
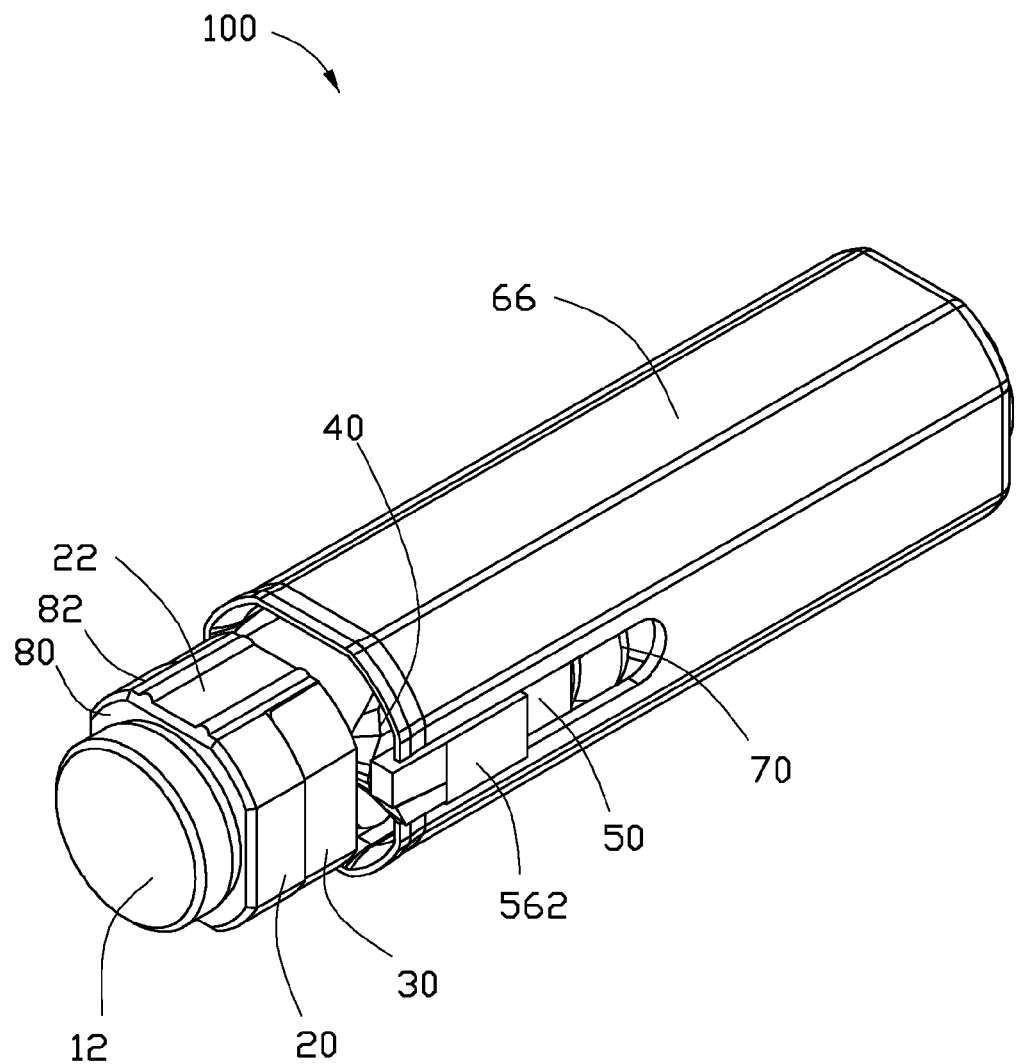
FIG. 4 is an assembled view of the hinge assembly shown in FIG. 1.

Referring to FIGS. 3 and 4, the follower 30 is latched to the seat 20. The block 3222 is received in the latching hole 212 of the seat 20, and the extensions 22 are latched in the receiving grooves 326. The cam 40 is latched to the latching member 50. The extending plates 55 are latched in the slots 44, and the arms 56 are latched in the retaining grooves 46. The distal end of the projections 562 are embedded in the stepped portion of the retaining grooves 46. Then, the conductive member 80, the follower 30 with the seat 20, and the cam 40 with the latching member 50 are mounted on the shaft 10. The head portion 12 abuts against the conductive member 80. The second cam surface 42 of the cam 40 engages with the first cam surface 342 of the follower 30. After that, the shaft 10 with the above elements is received in the sleeve 60 from the second end 64. The latching member 50 engages with the sleeve 60. The resilient member 70 is assembled into the sleeve 60 from the first open end 62, and is placed around the shaft portion 14. One free end the main shaft 10 passes through the first open end 62, and the washer 90 is mounted in the ring groove 142. One end of the resilient member 70 abuts against the second end 64, and the other end of the resilient member 70 abuts against the latching member 50. Thus, the hinge assembly 100 is integrated into a complete unit.

Since the seat 20 and the latching member 50 are made of plastic, the hinge assembly 100 makes relatively little noise.

It should be understood that the cam portions of the follower 30 and the cam 40 may have other shapes. The shape of the cam portion may be changed according to the desired open angle of the cover. The washer 90 may be soldered to the shaft 10. The head portion 12 may be integrally attached with the main shaft 10.

The seat 20 and the follower 30, the cam 40 and the latching member 50 may be formed in any manner that does not allow them to rotate relative to one another. For example, they can be integrally formed together by insert molding.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hinge assembly comprising:
   a shaft;
   a seat made of plastic;
   a follower made of metal, and including a cam surface, the seat being fixed to the follower, the seat and the follower placed around the shaft;
   a cam made of metal, and having a latching cam surface, the cam surface being engaged with the cam latching surface;
   a latching member made of plastic, the latching member fixed to the cam, the cam and the latching member placed around the shaft, an outer diameter of the cam being smaller than the latching member;
   a resilient member being placed around the shaft and providing an elastic force to make the cam surface abut against the latching cam surface; and
   a sleeve receiving the cam, the latching member and the resilient member, and the latching member engaging with the sleeve.

2. The hinge assembly as claimed in claim 1, wherein the seat includes a polygonal body, two extensions extend from an outer surface of the polygonal body, the follower includes two ledges, and two receiving grooves are defined between the ledges for receiving the extensions.

3. The hinge assembly as claimed in claim 2, wherein the polygonal body defines a square latching hole is defined at one side thereof, the follower includes a block integrally formed with the ledges, and the block is received in the latching hole.

4. The hinge assembly as claimed in claim 1, wherein the cam defines two slots and two retaining grooves, the latching member includes two extending plates and two arms, the extending plates are received in the slots, and the arms are latched in the retaining grooves to secure the latching member to the cam.

5. The hinge assembly as claimed in claim 4, wherein a distal end of each retaining groove is stepped, a projection is formed on each arm, a distal end of the projection is stepped for engaging with a corresponding retaining groove.

6. The hinge assembly as claimed in claim 1, further comprising a conductive member, wherein the conductive member is electrically connected the main shaft to the follower.

7. The hinge assembly as claimed in claim 6, wherein the conductive member includes a finger, the seat defines a groove, the follower member defines a latching groove, the finger is received in the groove and the latching groove.

8. A foldable electronic device having at least two components hinged together by a hinge assembly, the hinge assembly comprising:
   a shaft;
   a seat made of plastic engaging with one of the components;
   a follower made of metal, and including a cam surface, the seat being fixed to the follower, the seat and the follower placed around the shaft;
   a cam made of metal, and having a latching cam surface, the cam surface being engaged with the cam latching surface;
   a latching member made of plastic and fixed to the cam, the cam and the latching member placed around the shaft,
   a sleeve receiving the cam, the latching member and the resilient member, and the latching member engaging with the sleeve, the sleeve engaging with the other of the components; and
   a resilient member being placed around the shaft and providing an elastic force to make the cam surface abut against the latching cam surface.

9. The foldable electronic device as claimed in claim 8, further comprising a conductive member, wherein the conductive member is electrically connected the main shaft to the follower.

10. The foldable electronic device as claimed in claim 9, wherein the conductive member includes a finger, the seat defines a groove, the follower member defines a latching groove, and the finger is received in the groove and the latching groove.

11. The foldable electronic device as claimed in claim 10, wherein the seat includes a polygonal body, two extensions extend from an outer surface of the polygonal body, the follower includes two ledges, two receiving grooves are defined between the ledges for receiving the extensions.

12. The foldable electronic device as claimed in claim 11, wherein the polygonal body defines a square latching hole at one side thereof, the follower includes a block integrally formed with the ledges, and the block is received in the latching hole.

13. A hinge assembly comprising:
   a shaft;
   a follower including a plastic part and a metal part non-rotatably and non-slidably assembled to each other;

a cam including a plastic part and a metal part non-rotatably and non-slidably assembled to each other;

a resilient member, the follower, the cam and the resilient being placed around the shaft, and the resilient providing an elastic force to make the cam abut against the follower.

14. The hinge assembly as claimed in claim 13, further comprising a sleeve, the plastic part of the cam slidably engages with the sleeve.

* * * * *